(12) United States Patent
Landmann

(10) Patent No.: US 7,595,570 B2
(45) Date of Patent: Sep. 29, 2009

(54) SOLID STATE PRESSURE SWITCH

(75) Inventor: Wolf S. Landmann, Fair Lawn, NJ (US)

(73) Assignee: Kulite Semiconductor Products, Inc., Leomia, NJ (US)

( * ) Notice: Subject to any disclaimer, the term of this patent is extended or adjusted under 35 U.S.C. 154(b) by 413 days.

(21) Appl. No.: 11/512,467

(22) Filed: Aug. 30, 2006

(65) Prior Publication Data

US 2008/0054727 A1    Mar. 6, 2008

(51) Int. Cl.
*H01H 35/00*    (2006.01)
*H01H 37/00*    (2006.01)
(52) U.S. Cl. ...................................... 307/119; 307/117
(58) Field of Classification Search .................. 307/119, 307/117
See application file for complete search history.

(56) References Cited

U.S. PATENT DOCUMENTS

| | | | |
|---|---|---|---|
| 3,610,265 A | 10/1971 | McGuinness | |
| 3,764,950 A | 10/1973 | Wallia | |
| 3,800,264 A | 3/1974 | Kurtz et al. | |
| 3,868,719 A | 2/1975 | Kurtz, et al. | |
| 3,967,690 A | 7/1976 | Northcutt | |
| 4,063,209 A | 12/1977 | Kurtz et al. | |
| 4,106,349 A | 8/1978 | Kurtz | |
| 4,164,898 A | 8/1979 | Burgess et al. | |
| 4,233,848 A | 11/1980 | Sato et al. | |
| 4,242,914 A | 1/1981 | Eshelman et al. | |
| 4,275,393 A | 6/1981 | Johnston | |
| 4,412,203 A | 10/1983 | Kurtz et al. | |
| 4,414,539 A | 11/1983 | Armer | |
| 4,417,231 A | 11/1983 | Watt | |
| 4,450,716 A | 5/1984 | Lefaucheux et al. | |
| 4,462,018 A | 7/1984 | Yang et al. | |
| 4,513,623 A | 4/1985 | Kurtz et al. | |
| 4,553,474 A | 11/1985 | Wong et al. | |
| 4,594,881 A | 6/1986 | Imamura | |
| 4,613,851 A | 9/1986 | Hines | |
| 4,625,560 A | 12/1986 | Sanders | |
| 4,672,354 A | 6/1987 | Kurtz et al. | |
| 4,706,908 A | 11/1987 | Huffman et al. | |
| 4,764,747 A | 8/1988 | Kurtz et al. | |
| 4,777,826 A | 10/1988 | Rud, Jr. et al. | |

(Continued)

*Primary Examiner*—Fritz M Fleming
*Assistant Examiner*—Dru M Parries
(74) *Attorney, Agent, or Firm*—The Plevy Law Firm

(57) ABSTRACT

A pressure switch employs a Wheatstone bridge incorporating piezoresistive elements. The output of the bridge is monitored by a control circuit which produces a first control signal when a high pressure is achieved and produces a second control signal when a low pressure is achieved. The output of the control circuit is coupled to the gate electrode of a high current MOSFET device. The drain electrode of the MOSFET is coupled to one terminal of the motor where the other terminal of the motor is coupled to an operating potential. The source electrode of the MOSFET is coupled to ground. When the monitored pressure reaches a high threshold the MOSFET turns off as biased by the control circuit which in turn disables the motor. If the pressure drops, the control circuit detects this and produces the control signal, which activates the motor through the MOSFET. The gate electrode of the high current MOSFET is also connected to a thermal switch, which thermal switch is mounted on the motor housing and closes when the temperature of the motor exceeds a predetermined value. The closure of the thermal switch or the current switch disables the MOSFET and therefore disables the motor avoiding damage to the system.

17 Claims, 1 Drawing Sheet

U.S. PATENT DOCUMENTS

| | | |
|---|---|---|
| 4,814,856 A | 3/1989 | Kurtz et al. |
| 4,823,117 A | 4/1989 | Burcham |
| 4,858,620 A | 8/1989 | Sugarman et al. |
| 4,919,124 A | 4/1990 | Stevenson et al. |
| 5,002,901 A | 3/1991 | Kurtz et al. |
| 5,022,393 A | 6/1991 | McGrady et al. |
| 5,038,893 A | 8/1991 | Willner et al. |
| 5,051,729 A | 9/1991 | Gray |
| 5,184,515 A | 2/1993 | Terry et al. |
| 5,209,118 A | 5/1993 | Jerman |
| 5,273,486 A | 12/1993 | Emmons et al. |
| 5,286,671 A | 2/1994 | Kurtz et al. |
| 5,297,424 A | 3/1994 | Sackett |
| 5,318,018 A | 6/1994 | Puma et al. |
| 5,349,864 A | 9/1994 | Park et al. |
| 5,520,578 A | 5/1996 | Bloch et al. |
| 5,570,262 A * | 10/1996 | Doerwald ............. 361/99 |
| 5,737,222 A | 4/1998 | Palmer |
| 5,791,982 A | 8/1998 | Curry et al. |
| 5,817,943 A | 10/1998 | Welles, II et al. |
| 5,837,562 A | 11/1998 | Kurtz, et al. |
| 5,955,771 A | 9/1999 | Kurtz et al. |
| 5,965,807 A | 10/1999 | Yamashita et al. |
| 5,967,461 A | 10/1999 | Farrington |
| 5,973,590 A | 10/1999 | Kurtz et al. |
| 6,020,832 A | 2/2000 | Jensen |
| 6,210,989 B1 | 4/2001 | Kurtz et al. |
| 6,232,875 B1 | 5/2001 | DeZorzi |
| 6,262,550 B1 * | 7/2001 | Kliman et al. ......... 318/565 |
| 6,545,610 B2 | 4/2003 | Kurtz et al. |
| 7,034,700 B2 | 4/2006 | Kurtz et al. |
| 2006/0274468 A1 * | 12/2006 | Phadke ................ 361/93.1 |

* cited by examiner

SOLID STATE PRESSURE SWITCH

FIELD OF THE INVENTION

This invention relates to pressure switches, in general and more particularly to a pressure switch employing piezoresistive sensors.

BACKGROUND OF THE INVENTION

A pressure switch is a device that closes or opens an electrical contact when a pressure is above or below a certain preset threshold. Such switches are utilized in a wide variety of applications, as in automobiles, aircrafts and various other environments. Many pressure switches utilize electromechanical devices, while others utilize a combination of piezoresistive devices or other pressure measuring sensors in conjunction with electromechanical relays. For examples of solid state electronic pressure switches which are employed to circumvent the use of electromechanical devices, reference is made to U.S. Pat. No. 6,545,610 entitled "Pressure Transducer and Switch Combination" which issued on Apr. 8, 2003, to A. D. Kurtz et al and is assigned to the assignee herein. In that patent, there is shown a device for providing a plurality of indications of a monitored pressure at a selected value. The device includes an electronic interface having an input and an output, a resistor structure adapted to measure the pressure and electrically coupled to the interface. There is shown a first output for providing a signal indicative of the selected pressure and the first output is electrically connected to the output or an electronic interface. There is a comparator coupled to the interface which comparator provides a signal indicative of whether the monitored pressure is greater than a threshold. This is one example of an electronic pressure transducer switch which includes a piezoresistive structure. See also U.S. Pat. No. 7,034,700 entitled "Solid State Electronic Pressure Switch", which issued on Apr. 25, 2006, to A.D. Kurtz et al and assigned to the assignee herein. In that patent there is shown an electronic single pole double throw (SPDT) switch which operates in two states. In one state one of the lamps is on and the other lamp is off. In the electronic switch the voltage which is at the output terminal of the lamp that is off is utilized to drive a voltage regulator which operates electronic circuitry associated with the switch. The switch depicted is utilized to replace a mechanical switch without additional wiring. The purpose is to provide an electronic SPDT switch, without making changes to the terminals in the switch operating environment. The characteristic of electronic switches are significantly better than their mechanical counterparts. This is due to the fact that reliability and stability is very good in regard to such switches and many systems use only electronic switches. In any event, pressure switches are widely employed and used in conjunction with electromechanical relays, with applications including, for example aircraft systems, industrial installations and the like. However, use of a pressure sensor in conjunction with electromechanical relays may cause problems. For example, such switches may be used in conjunction with relays to operate motors or other devices. Such devices have high inductive impedances and therefore the opening and closing of mechanical switches produces large transients which may damage relay contacts or which may affect other elements. It is also understood that mechanical relays do not have the life expectancy of electronic components. Thus, it would be desirable to provide a solid state switch utilizing piezoresistive sensors which combines the functions traditionally implemented by electromechanical relays, and which may be implemented at lower costs with better reliability, less cabling and smaller connectors.

SUMMARY OF THE INVENTION

A pressure switch comprising, a bridge array including sensing elements, which array provides an output proportional to a pressure applied to said bridge, a control circuit responsive to said bridge output to provide at an output terminal a first control signal indicative of a high pressure output from said array and to provide a second control signal indicative of a lower pressure output from said array. A high current MOSFET having a gate, source and drain electrode, with said gate electrode coupled to said output terminal of said control circuit, with said source electrode connected directly to an inductive or resistive load, with said drain electrode coupled to a point of reference potential wherein during the presence of one control signal said load is energized and during the presence of said other control signal said load is de-energized.

DETAILED DESCRIPTION OF THE INVENTION

Figure 1:
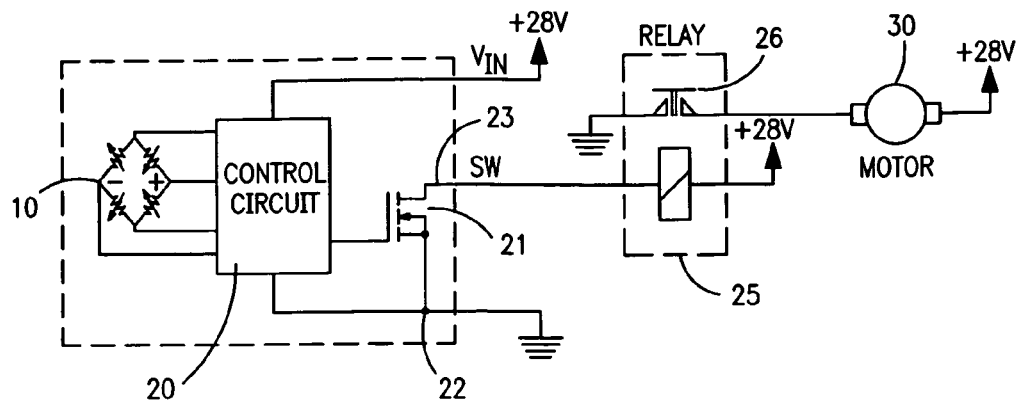
FIG. 1 is a schematic diagram depicting a prior art pressure switch employing an electromechanical relay.

Referring to FIG. 1, there is shown a schematic of a prior art pressure switch configuration. The bridge array 10 normally contains four piezoresistors which as shown are arranged in a Wheatstone bridge configuration. The utilization of Wheatstone bridges employing semiconductor piezoresistors is well known and the assignee herein, namely Kulite Semiconductor Products, Inc., has many patents showing various configurations of piezoresistors employed in Wheatstone or other bridge arrays. See for example U.S. Pat. No. 6,210,989 entitled "Ultra Thin Surface Mount Wafer Sensor Structures and Methods For Fabricating Same" issued on Apr. 3, 2001, to A. D. Kurtz et al. That patent is also assigned to Kulite Semiconductor Products, Inc., the assignee herein. That patent references many other Kulite patents which also show piezoresistive sensors located in Wheatstone bridge configurations. Such a Wheatstone bridge is well known. While four piezoresistors are shown, it is also indicated that there can be two piezoresistors in one arm of the bridge and two fixed resistors in the other arm of the bridge for certain applications. The output of the bridge, which is between the terminals marked plus (+) and minus (−) is directed to the inputs of the control circuit 20. The control circuit 20 also supplies biasing to the bridge as well as reference potential. The control circuit 20 receives operating potential from a DC source designated as +28V. The control circuit essentially monitors the output of the bridge and provides high and low outputs when the bridge indicates a high and low pressure. The output of the control circuit is coupled to the gate electrode of a MOSFET 21. The drain electrode 23 is coupled to the coil of a relay 25 which receives operating potential from the +28V source. The source electrode of the MOSFET is coupled to a point of reference potential. The relay contacts 26 are coupled to one operating terminal of a motor 30 having the other operating terminal of the motor coupled to the biasing supply.

The motor 20 may be the motor of a pump as will be explained. Essentially the MOSFET 21 is an enhancement type field effect transistor. These devices are used as very effective switches. Below the threshold voltage no inversion layer is created and no significant current can flow between the drain and source electrodes. Once a voltage in excess of the threshold is applied, then a very low resistance path exists between the source and drain. When switching loads with significant inductance such as large horsepower electric motors the transient created when the current is interrupted present damaging voltage to the gate of the transistor. The gate oxide in a typical MOSFET 21 as employed in the prior art circuit of FIG. 1 is very thin and easily punctured by large transient voltage. This gate voltage sensitivity requires additional protective circuit when switching power to inductive loads such as a motor. Such protective circuitry is incorporated in the control circuit 20 or may be incorporated within the MOSFET device 21.

Figure 2:
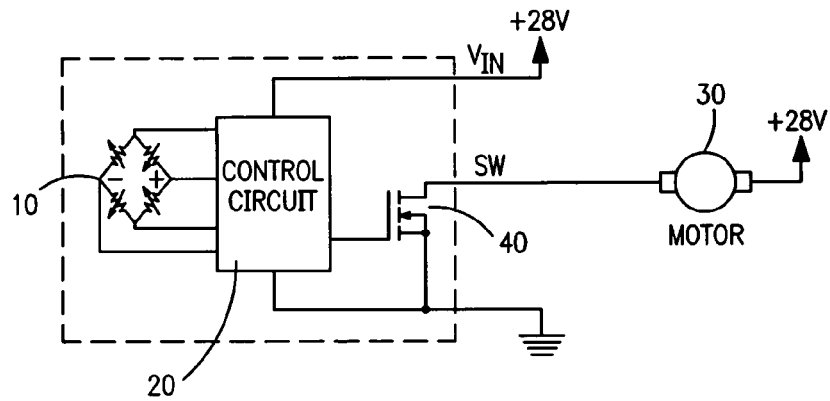
FIG. 2 is a schematic diagram depicting a pressure switch according to this invention.

Referring to FIG. 2 there is shown a Wheatstone bridge 10 employing piezoresistors, a control circuit 20 and a MOSFET 40 having the source electrode coupled to one terminal of motor 30 having a drain electrode coupled to a point of reference potential. The MOSFET 40 shown herein is a vertically implemented MOSFET. These devices have increased current capacity. Such devices can pass hundreds of amps and withstand hundreds of volts when switching resistive loads. It is understood that as the voltage requirements increase, so does the on resistance of such power MOSFET's. Such MOSFET's as shown, for example, in FIG. 2 are designated as power MOSFET's and have an insulating oxide layer separating the gate contact and the silicon substrate. This layer provides a large input resistance so that the control power necessary to switch these devices is much lower than for an ordinary bipolar transistor. Such devices are enhancement devices where a non zero gate to source voltage must be applied to form a conducting channel between the drain and source to allow external current to flow. Shown in FIGS. 1 and 2 is a N-channel MOS device. The device 40 is referred to as an N-channel enhancement mode FET. Essentially the difference between FIG. 1 and FIG. 2 is that in FIG. 2 the relay together with its coil is eliminated. The coil is an inductor and produces large transients, which may destroy the prior art MOSFET 21 whereas in FIG. 2 at high power and high current FET is employed and such a high power device will withstand large voltage transients which would be produced by the motor coil. It is of course seen that the circuit schematic of FIG. 2 totally eliminates the need for electromechanical relay as in FIG. 1.

The prior art circuit shown in FIG. 1 is employed in an accumulator system for aircraft hydraulics. The switch in this system senses the pressure in the accumulator by means of the Wheatstone bridge 10. The switching component as seen is a MOSFET transistor, which is driven by the control circuit 20. The control circuit 20 senses the output of the piezoresistive bridge 10. There are many examples of control circuits as 20 which can respond to the output of the Wheatstone bridge 10. The output of the Wheatstone bridge typically varies with an applied pressure. As indicated above, the Wheatstone bridge is normally implemented by semiconductor techniques where the piezoresistors are deposited on a semiconductor wafer in a thinned active region. The thinned active region acts as a diaphragm and when a pressure is applied to the diaphragm the piezoresistors change resistance according to the applied pressure. This is well known in the art. Control circuits such as 20, for monitoring the output of the Wheatstone bridge are also well known. The control circuit can include comparators which will operate to produce an output between a high and a low voltage.

When the system is started the voltage from the Wheatstone bridge 10 is indicative of a low pressure. The switch in the low condition operates the relay coil which in turn closes the contacts 26 which activate the motor/pump 30. When the pressure reaches a predetermined high threshold (for example 3,000 psi) the switch 21 opens as the gate electrode of the switch is controlled by the control circuit. When the switch 21 opens or reverts to a high impedance state, the relay coil does not operate the contacts and hence the motor is turned off. If subsequently the pressure drops due to the activation of the hydraulic system or due to leakages, then a predetermined low pressure threshold is reached which for example may be 2600 psi. In this low threshold condition the switch 21 again closes, and again through the relay 26 activates the motor. The motor/pump 30 continues to work until the pressure reaches the high threshold where the switch opens and stops the motor. This way the pressure is maintained within the low and high thresholds. This implementation is possible due to the very tight tolerances of the two thresholds which can be achieved with a solid state switch as 21 together with the control circuit 20.

The relay 25 is activated and deactivated at random intervals and hence there are many transients produced across transistor 21 based on the activation and deactivation of the relay coil. When the contacts 26 are operated there are also transients which exist across the contacts. The continuous operation of the relay between an active and inactive state can cause the relay contacts to corrode or otherwise deteriorate and hence the relay is replaced often. Thus, in FIG. 2 it is seen that the relay is eliminated and the high current MOSFET 40 now directly operates the motor 30. The motor transients do not affect the MOSFET device 40 as it is a N-type enhancement device capable of withstanding high currents and high voltages.

Figure 3:
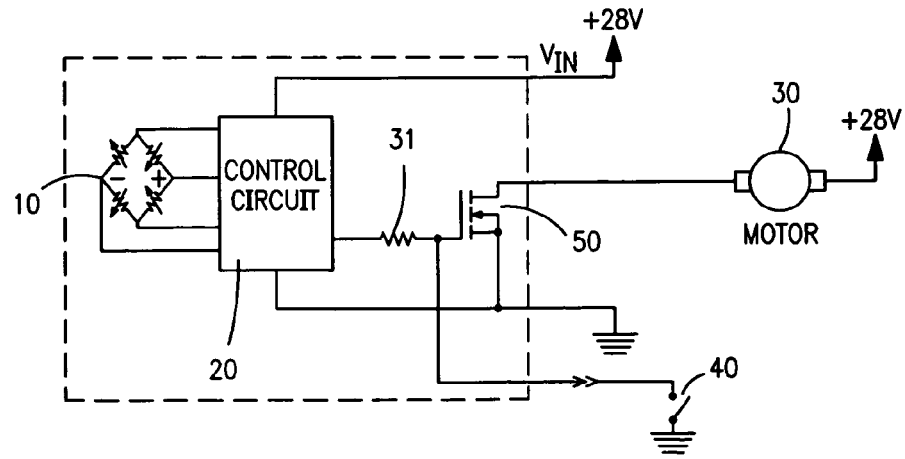
FIG. 3 is a schematic diagram depicting an alternate pressure switch with a disable function according to this invention.

Referring to FIG. 3, there is shown a circuit schematic of an embodiment of the present invention. As seen in FIG. 3, there is shown the Wheatstone bridge 10 which interfaces with the control circuit 20 just as implemented in FIG. 1 and FIG. 2. In FIG. 3 there is a resistor 31 in series with the gate electrode of the high power or high current MOSFET 50. Again the source electrode is coupled to one terminal of the motor 30 whereas the drain electrode is coupled to ground or to reference potential as in FIGS. 1 and 2. Also shown coupled to the gate electrode is a thermal switch which can be a mechanical or an electronic thermistor or a RTD based switch. Devices such as 40 can operate as a temperature controlled switch and closes when a monitored temperature exceeds a predetermined value. Thus, the switch 40 operates to disable the MOSFET 50 when the contact is closed. As one can see the gate electrode upon closure of switch 40 goes to ground, which in essence turns the MOSFET 50 off, preventing the motor 30 from operating. This disable is a protection device. If there is a short circuit in the motor winding the relay shown in FIG. 1 can be damaged as well as there could be damage to the FET 21 without the disable operation. In this system shown in FIG. 3, the switch 40 is a thermal switch which is mounted directly on the housing of the motor 30 or in close proximity thereto. As one can understand, motors are surrounded by typical metal housing which also serves as a heat sink and on this housing a thermal switch can be mounted. In this manner if the motor 30 overheats, the thermal switch 40 closes which disables the MOS device 50 thus avoiding further damage to the system. Thus, there is shown an improved switching mechanism for a pressure switch eliminating electromechanical relays and therefore eliminating the contacts associated therewith.

The switch 40 can be an overcurrent switch, which senses the current through the motor winding and closes when this current is above a predetermined threshold. This combination is another way of preventing further damage to the system in case of a short circuit in the motor. Alternatively, the switch 40 can be replaced by a parallel combination of a thermal and current switches, implementing a double protection of the system in case of overcurrent or overheating.

It should be clear to one skilled in the art that many alternative embodiments can be configured, all of which are deemed to be anticipated as encompassed within the spirit and scope of the claims appended hereto.

What is claimed is:

1. A pressure switch, comprising:
a bridge array including sensing elements, which array provides an output proportional to a pressure applied to said bridge,
a control circuit responsive to said bridge output to provide at an output terminal a first control signal indicative of a high pressure output from said array and to provide a second control signal indicative of a lower pressure output from said array,
a high current MOSFET having a gate, source and drain electrode, with said gate electrode coupled to said output terminal of said control circuit through a resistor, with said drain electrode connected directly to an inductive load, and with said source electrode coupled to a point of reference potential wherein during the presence of one control signal said load is energized and during the presence of said other control signal said load is de-energized; and
a thermal device positioned in thermal contact with said inductive load to monitor the temperature of said inductive load, and operative to provide a first output when the temperature of said inductive load exceeds a desired value, said thermal device directly coupled to said gate electrode of said MOSFET to turn said MOSFET off.

2. The pressure switch according to claim 1, wherein said inductive load is the coil of a motor.

3. The pressure switch according to claim 1, wherein said MOSFET is a n-channel enhancement MOSFET.

4. The pressure switch according to claim 1, wherein said bridge array is a Wheatstone bridge including piezoresistive sensing elements.

5. The pressure switch according to claim 2, wherein said motor controls a pump in an accumulator system of an aircraft.

6. The pressure switch according to claim 5, wherein said high pressure output is a pressure of at least 3000 psi or more and said low pressure output is a pressure of at least 2600 or less.

7. The pressure switch according to claim 1, wherein said thermal device is a thermistor switch.

8. The pressure switch according to claim 1, wherein said thermal device is a RTD.

9. A pressure switch for monitoring the pressure in a system having a motor which drives a pump to operate a hydraulic system, the combination comprising:
a Wheatstone bridge having piezoresistive devices, said piezoresistive devices having resistance changes proportional to an applied pressure, said bridge providing an output proportional to an applied pressure,
a control circuit coupled to said bridge and responsive to said output to provide a first control signal at an output terminal when a predetermined high pressure is present and to provide a second control signal at said output terminal when a predetermined low pressure is present,
an enhancement MOSFET having a gate, source and drain electrode with said gate electrode coupled to said output terminal of said control circuit, with said source electrode coupled to an operating terminal of said motor and with said drain electrode coupled to a point of reference potential, said MOSFET operative to activate said motor during the presence of one of said first and second control signals and to deactivate said motor during the presence of the other of said first and second control signals,
a thermal switch positioned in the vicinity of said motor and responsive to the temperature of said motor, said thermal switch coupled to said gate electrode of said MOSFET to turn said MOSFET off when said temperature of said motor exceeds a predetermined value to thereby keep said motor deactivated as long as said temperature exceeds said predetermined value
wherein said control circuit output terminal is connected to said MOSFET gate electrode through a resistor and said thermal switch is connected directly to said MOSFET gate electrode.

10. The pressure switch according to claim 9, wherein said MOSFET is an N-type enhancement MOSFET.

11. The pressure switch according to claim 9, wherein said motor is de-activated by said first control signal and activated by said second control signal.

12. The pressure switch according to claim 9, wherein said system is a system for hydraulic pressure.

13. The pressure switch according to claim 9, wherein said high pressure is 3000 psi or greater.

14. The pressure switch according to claim 13, wherein said low pressure is 2600 psi or lower.

15. The pressure switch according to claim 12, wherein said hydraulic system is an aircraft accumulator system.

16. The pressure switch according to claim 9, wherein said thermal switch is a thermistor controlled switch.

17. The pressure switch according to claim 9, wherein said thermal switch is a RTD.

* * * * *